(12) United States Patent
Singh et al.

(10) Patent No.: US 12,026,570 B1
(45) Date of Patent: Jul. 2, 2024

(54) 3-D PRINTING CARDS LEVERAGING AN EXTENDED REALITY (XR) ENVIRONMENT AND MICRO ELECTROMECHANICAL SYSTEMS (MEMS) TECHNOLOGY

(71) Applicant: Bank of America Corporation, Charlotte, NC (US)

(72) Inventors: Shailendra Singh, Maharashtra (IN); Sandeep Kumar Chauhan, Hyderabad (IN); Sheetal Bhatia, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/140,058

(22) Filed: Apr. 27, 2023

(51) Int. Cl.
*G06K 19/077* (2006.01)
*G05B 19/4099* (2006.01)
*G06Q 20/06* (2012.01)

(52) U.S. Cl.
CPC ... *G06K 19/07722* (2013.01); *G05B 19/4099* (2013.01); *G06Q 20/065* (2013.01); *G05B 2219/49023* (2013.01)

(58) Field of Classification Search
CPC .......... G06K 19/07722; G05B 19/4099; G05B 2219/49023; G06Q 20/065
See application file for complete search history.

(56) References Cited

U.S. PATENT DOCUMENTS

| 9,436,335 | B1 * | 9/2016 | Scherer | G06F 3/023 |
| 10,825,004 | B1 * | 11/2020 | Walker | G06Q 20/321 |
| 11,481,594 | B1 | 10/2022 | Singh et al. | |
| 11,551,197 | B2 * | 1/2023 | Gupta | G02B 27/0172 |
| 2023/0290075 | A1 * | 9/2023 | Ma | G06Q 20/342 |

OTHER PUBLICATIONS

Saviour Nickolas Derel J., "Smart Dust-Microelectromechanical systems (MEMS)" https://www.gavstech.com/smart-dust-microelectromechanical-systems-mems/, May 9, 2019.
"What is Smart Dust and How is it Used?" https://www.nanowerk.com/smartdust.php, Retrieved on Jan. 24, 2023.

* cited by examiner

*Primary Examiner* — Sonji N Johnson
(74) *Attorney, Agent, or Firm* — Weiss & Arons LLP

(57) ABSTRACT

A user may print a smart card on-demand by leveraging an Extended Reality (XR) interface to enter card specifications and supply them to a card issuer as an encrypted payload. The card issuer may send the user a non-fungible token (NFT) with instructions for rendering and 3D printing the card using the user's XR interface. The printed card may have an interior layer that includes a pattern of micro electromechanical sensor (MEMS) tactile sensors that uniquely identify the card. The sensors may be placed in selected locations based on a predefined grid pattern of potential sensor locations. The 3D printer may add a non-programmed smart chip to the card. The 3D printer may be a user's printer, or may be a 3D printer at an automated teller machine (ATM). An ATM may be configured to validate and activate the card after detecting the MEMS pattern and programming the smart chip.

20 Claims, 10 Drawing Sheets

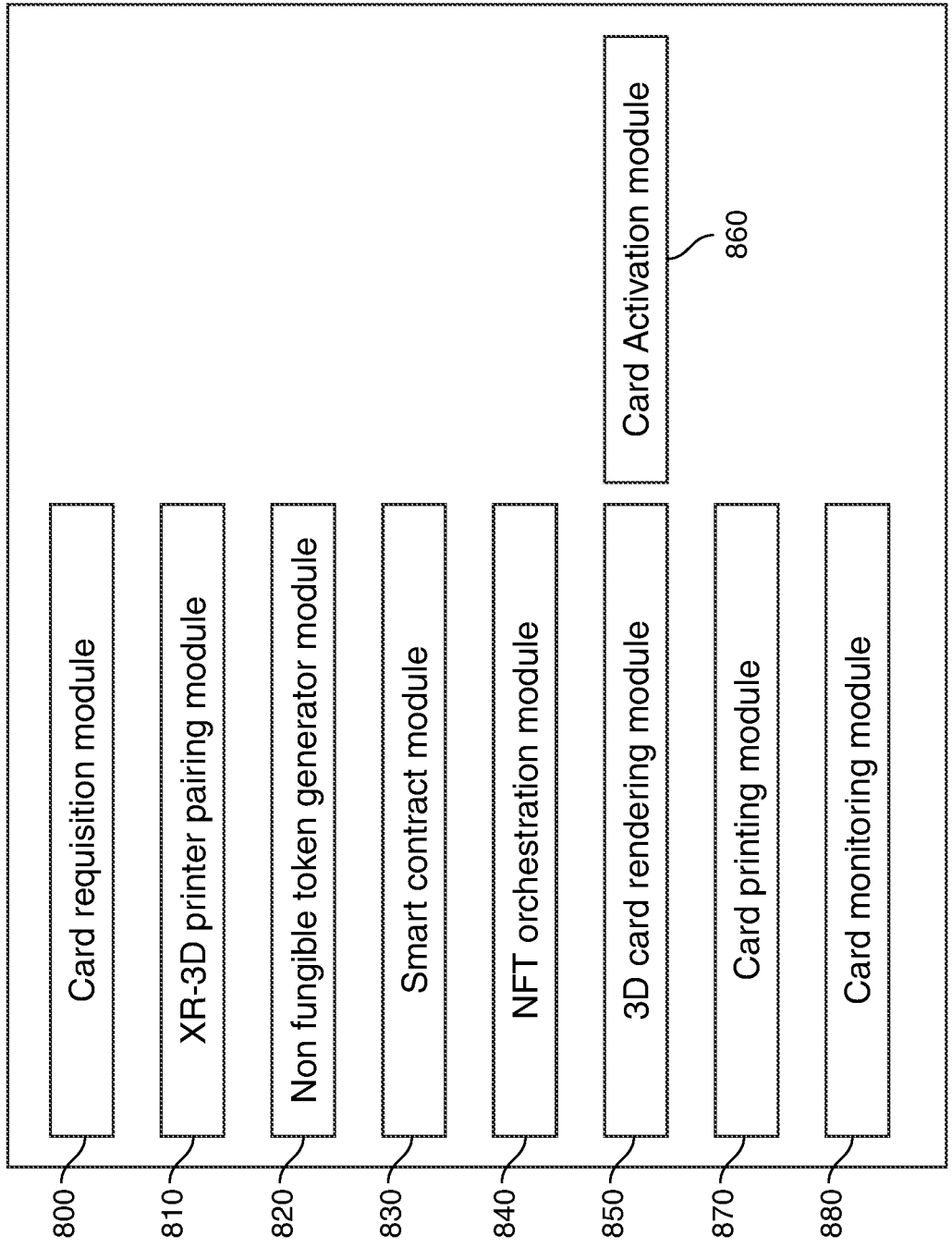

3-D PRINTING CARDS LEVERAGING AN EXTENDED REALITY (XR) ENVIRONMENT AND MICRO ELECTROMECHANICAL SYSTEMS (MEMS) TECHNOLOGY

FIELD OF THE DISCLOSURE

Aspects of the disclosure relate to methods and apparatus for a consumer to 3D print a payment instrument by leveraging an XR environment and MEMS technology.

BACKGROUND OF THE DISCLOSURE

A bank customer may request a replacement payment instrument, such as card, because the customer's previous payment instrument has been misplaced, damaged, stolen or for some other reason. Once requested, it typically takes time for the replacement payment instrument to be manufactured, and sent to the customer, such as by mail or express service. This delay is undesirable for customers, who rely on their payment instruments for making purchases and need a replacement quickly, and for the issuer of the payment instrument who wants the customer to have access to their card.

The payment instrument may be one of a credit card and/or other forms of payment instruments, such as a debit card, prepaid card, an instrument or device that includes a contactless chip, such as an ISO 14443-compliant contactless chip, or any other suitable electronic payment instrument. Payment instruments may store data in a magnetic strip, a bar code, a silicon chip or any other suitable data storage device or format. A point-of-sale terminal may receive data from, provide data to, or exchange data with the payment instrument to conduct a transaction.

A conventional form factor of a payment instrument is limited. A payment instrument is typically 85.60 millimeters ("mm")×53.98 mm×0.8 mm. This form factor allows payment instruments to fit easily into a customer's wallet or pocket. However, the limited size of this form factor also presents design challenges and exacerbates the technical challenge of providing secure on-demand production of a payment instrument.

Incorporating electronic features into a payment instrument may provide technology-based solutions that securely protect sensitive data and provide tools for identifying replacement payment instruments manufactured without authorization. However, it is difficult to include electronic features in such a limited size device. For example, to maintain its limited form factor, a purchasing instrument cannot be constructed using a relatively large power supply.

SUMMARY OF THE DISCLOSURE

It is an object of this invention to enable a fast, secure self-service mechanism by which a customer can print a payment instrument on-demand from a convenient location.

A computer program product in accordance with principles of the disclosure may include executable instructions that, when executed by a processor on a computer system, enable a user to print a payment instrument on-demand. The payment instrument may be of a size that is no larger than 85.6 mm by 53.98 mm×0.8 mm.

The computer program product may provide an extended reality (XR) user interface on the XR device for the user to enter one or more specifications for the payment instrument to be printed on a 3D printer by the user. The XR user interface may be configured to present to the user an interface comprising one or more fields in which the user is to enter the one or more specifications. The one or more specifications may include, for example, one or more of customer name, account number, card type, card picture, card shape, or card thickness.

The issuer of payment instruments may receive from the user a request to authorize the printing of the payment instrument based on the one or more specifications entered by the user at the XR device. The issuer may validate the request and generate, upon successful validation of the request, a non-fungible token (NFT) that includes a payload having instructions for the user to render the payment instrument on the XR device and to print the payment instrument on the 3D printer. The NFT may be transmitted to the user for 3D printing the payment instrument.

The computer program product may enable the issuer to specify, in the payload of the NFT, instructions for printing in the payment instrument a pattern of micro electromechanical system (MEMS) sensors that are unique to the payment instrument to be printed. The specified pattern of MEMS sensors may be selected by the issuer for placement in selected locations of the payment instrument based on a predefined grid pattern of potential MEMS sensor locations. The payment instrument may be printed as multiple layers, and the pattern of MEMS sensors may be configured to be printed by the 3D printer in one of the multiple layers in the smart card.

The computer program product may enable authenticating, at an automated teller machine (ATM), the payment instrument after the payment instrument has been 3D-printed by sensing the pattern of MEMS sensors in the card that are unique to the printed payment instrument, programming, at the ATM, the smart chip upon authentication of the payment instrument; and activating, at the ATM, the payment instrument for use.

The user may be enabled to render an image of the payment instrument on the XR device based on the NFT before the payment instrument is printed on the 3D printer. The user may print the payment instrument on the 3D printer on demand after the user receives the NFT at the XR device. An unprogrammed smart chip may be included in the payment instrument during the printing of the payment instrument.

The 3D printer may be paired to the XR device. The 3D printer may be located at an ATM or elsewhere, such as at the user's home or office.

The user may cause the NFT to be transmitted to the ATM for the user to print the payment instrument on demand at the ATM. The user may transmit the NFT received by the user to the ATM, or the user may request that a copy of the NFT be transmitted from the issuer to the ATM directly.

A method in accordance with principles of the disclosure may include providing, to a user at an XR device, an extended reality (XR) user interface on the XR device, wherein the user interface is configured for the user to enter one or more specifications for the payment instrument to be printed by the user on demand on a 3D printer. The method may include receiving, by an issuer of payment instruments from the user, a request to authorize the printing of the payment instrument based on the one or more specifications entered by the user at the XR device, validating, by the issuer, the request, generating, by the issuer upon successful validation of the request, an NFT that includes a payload having instructions for the user to render the payment instrument on the XR device and to print the payment instrument on the 3D printer, and transmitting, by the issuer, the NFT to the user for 3D printing the payment instrument.

The method may include specifying, by the issuer in the payload of the NFT, instructions for printing in the payment instrument a pattern of MEMS sensors that are unique to the payment instrument to be printed. The specified pattern of MEMS sensors may be selected by the issuer for placement in selected locations of the payment instrument based on a predefined grid pattern of potential MEMS sensor locations.

The method may include authenticating, at an ATM, the payment instrument after the payment instrument has been 3D-printed by sensing the pattern of MEMS sensors in the card that are unique to the printed payment instrument, programming, at the ATM, the smart chip upon authentication of the payment instrument, and activating, at the ATM, the payment instrument for use.

An ATM in accordance with the principles of the disclosure may be configured to perform banking transactions and manufacture a payment instrument on a 3D printer. The ATM may include a 3D printer to 3D print the payment instrument, including one or more feeds to feed to the 3D printer materials for printing the payment instrument based on the one or more specifications of a user and printing on the payment instrument a smart chip and a pattern of MEMS specified by an issuer of the payment instrument. The ATM may include a processor that is configured to receive an NFT that includes a payload having instructions for printing the payment instrument and to print the payment instrument on the 3D printer at the ATM based on the received NFT. The instructions for printing the payment instrument may include instructions for printing a unique pattern of MEMS sensors in the payment instrument. The unique pattern of MEMS sensors to be printed may be specified by the issuer of the payment instrument and may be unique to the payment instrument to be printed. The pattern of MEMS sensors may be specified to be placed in locations of the payment instrument based on a predefined grid pattern of potential MEMS sensor locations.

The ATM may include a communications interface to pair the ATM to an XR device of the user. The XR device may be configured to provide an XR user interface on the XR device and to enable the user to enter one or more specifications for the payment instrument to be 3D printed by the user and to obtain the NFT from the issuer of the payment instrument. The issuer may generate, upon successful validation of the request, an NFT that includes a payload having instructions for printing the payment instrument on the 3D printer of the ATM, and transmit, in response to the request, the NFT to the XR user interface to be used by the user to authorize the printing of the payment instrument on the 3D printer of the ATM.

An ATM in accordance with the principles of the disclosure may perform banking transactions and authenticate a payment instrument that has been printed on-demand by a user on a 3D printer. The ATM may include a card activation device that is configured to authenticate the payment instrument by tactilely activating a unique pattern of MEMS sensors in the payment instrument by exerting pressure on the payment instrument and the MEMS sensors therein and reading the unique pattern of MEMS sensors. The ATM may include a processor that is configured to program the smart chip and activate the payment instrument for use upon authentication of the payment instrument. The ATM may include a 3D printer to 3D print the payment instrument, including one or more feeds to feed to the 3D printer materials for printing the payment instrument based on the one or more specifications of a user and printing on the payment instrument a smart chip and the pattern of MEMS specified by an issuer of the payment instrument. The payment instrument to be authenticated may be generated by providing, to a user at an XR device, an XR user interface on the XR device, wherein the user interface is configured for the user to enter one or more specifications for the payment instrument to be printed on a 3D printer by the user. The payment instrument may have been generated by receiving, by an issuer of payment instruments from the user, a request to authorize the printing of the payment instrument based on the one or more specifications entered by the user at the XR device, validating, by the issuer, the request, generating, by the issuer upon successful validation of the request, an NFT that includes a payload having instructions for the user to render the payment instrument on the XR device and to print the payment instrument on the 3D printer, transmitting, by the issuer, the NFT to the user for printing the payment instrument on the 3D printer, and specifying, by the issuer, a pattern of micro electromechanical system (MEMS) sensors that are unique to the payment instrument to be printed. The instructions in the payload of the NFT for printing the payment instrument may include instructions for printing the unique pattern of MEMS sensors in the payment instrument.

The ATM may include a communications interface for a user device to access the ATM to authenticate the payment instrument that has been 3D-printed by sensing the pattern of MEMS sensors in the payment instrument, program the smart chip, and activate the payment instrument.

The payment instrument may be, for example, a smart card like a credit card, a debit card, or a prepaid card.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 8 shows an illustrative example of modules that may be used in accordance with principles of the disclosure.

DETAILED DESCRIPTION OF THE DISCLOSURE

Figure 1:
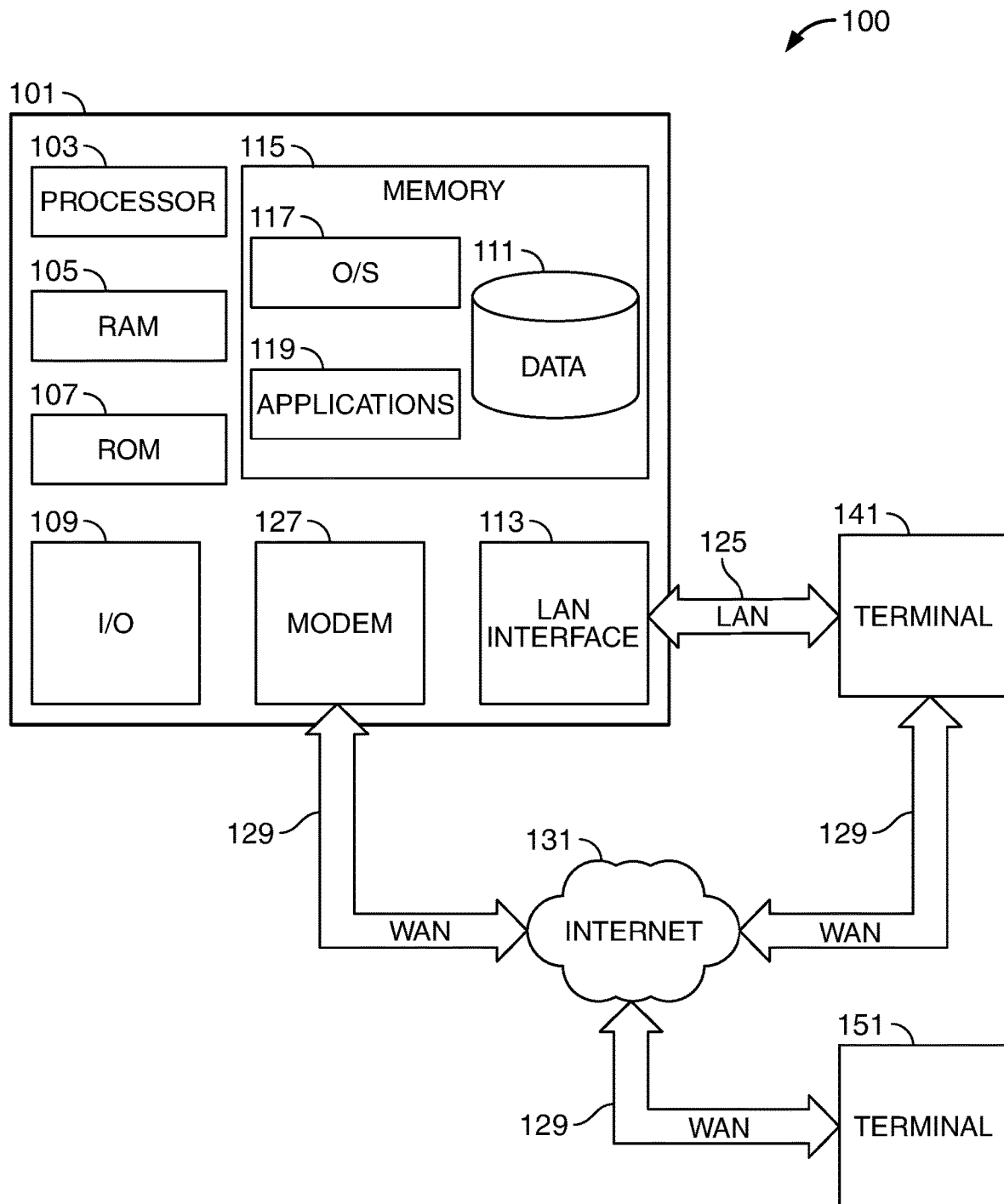
FIG. 1 shows an illustrative system architecture in accordance with principles of the disclosure.

The present disclosure relates to computer program products, methods, and apparatus for a customer (user) to obtain a customized payment instrument, such as a replacement smart card like a credit card, debit card, or prepaid card from a bank or other card issuer, by 3D printing the card on-demand.

The methods, apparatus, computer program products and systems described herein leverage an Extended Reality (XR) metaverse environment. The metaverse environment may be a three-dimensional ("3D") virtual immersive space, like a virtual reality (VR), augmented reality (AR), or mixed reality environment, in which users may interact. A user (e.g., a customer of the issuer) may use an interface to the XR environment to interact with the issuer of the payment instrument, like a card, to specify information to be included on the payment instrument and desired properties of the payment instrument, such as thickness, custom shape, image, and embossing details for a card.

Some of the properties of the payment instrument, such as the dimensions, may be fixed so as to operate in a standardized payment instrument environment. A conventional form factor of the payment instrument may typically be 85.60 millimeters ("mm")×53.98 mm×0.8 mm.

Information printed on the payment instrument may be based on a template specified by the issuer of the payment instrument. Optionally, the payment instrument may have no information printed on its exterior. A request for the customized payment instrument, including the user-specified information, may be sent to the issuer of the payment instrument as an encrypted payload.

Upon receiving the request, the issuer may decrypt the payload and may send back to the user, using the XR environment, a unique non-fungible token (NFT) that includes a card-printing payload with instructions for 3D printing the requested card. To maintain confidentiality, the NFT may be a private, confidential NFT. The NFT may be recorded on a blockchain to minimize potential fraud. The instructions in the NFT may include instructions for rendering the payment instrument using a 3D printer.

The instructions may include instructions such that the payment instrument to be printed may include on the outside of the payment instrument information that the customer has requested to be printed. The payment instrument may include a unique pattern of smart dust as specified by the issuer of the payment instrument. The unique pattern of smart dust may be included, for example, as on a layer inside a multiple-layered payment instrument. The unique pattern of smart dust may be tactile sensitive MEMS smart dust that may be printed in various locations within a predefined grid pattern and may uniquely identify the payment instrument based on the locations within the grid pattern that are occupied by the MEMS smart dust. The 3D printer may also add a non-programmed integrated circuit chip, like a smart chip, to the payment instrument, such as in a cavity in the payment instrument. The 3D printer may be located where the customer may access it, such as near the customer or at an ATM. An ATM may be configured to add a smart chip to the payment instrument if the smart chip is not already added by a 3D printer that is not located at the ATM.

The ATM may tactilely activate the MEMS sensors using a card activation device and may check the unique MEMS pattern on the payment instrument upon triggering the activation of the sensors. The MEMS pattern may provide a key for the ATM to program the smart chip. The programming of the smart chip may be performed using a specialized program that corresponds to the type of payment instrument that is being fabricated, specifications of the issuer, or specifications for interacting with the issuer's programs or servers. For example, a 3-D printed card may be programmed as a credit card, a debit card, or a prepaid card. Also, programming for one issuer may be different than for another issuer.

Upon validation of the payment instrument, the ATM may initiate a chip burning process to program the smart chip on the card, and may activate the payment instrument. Thus, a customer may obtain a new or replacement card by leveraging the XR environment.

The smart chip on the card (payment instrument) may be an "EMV" chip. EMV is a technology that derives its name from the companies (Europay, MasterCard, and Visa) that helped develop the technology. An EMV chip typically may be programmed to store a computer program. The computer program is typically stored on the EMV chip by an issuer of the card at the time that the card is manufactured. However, when 3D printing the card in accordance with the present disclosure, the smart chip may be programmed later as part of the activation of the smart chip.

The issuer may program the smart chip by loading a specialized program on the EMV chip that is configured to interact with computer systems of the issuer. The specialized program may interact with a point of sale (POS) terminal and instruct the POS terminal to interact with the card using a protocol defined by the issuer.

Generally, once activated, when the card and its associated smart chip, e.g., a EMV chip, are inserted into a specialized card reader, the card reader powers the smart chip, and the smart chip generates a new authorization code each time the card is used to initiate a transaction. The generated authorization code is transmitted to the issuer's computer system. The issuer's computer system then determines whether to allow the requested transaction to proceed. Because the EMV chip is programmed to dynamically generate a new authorization for each transaction, simply copying the sensitive data printed on the face of the card or encoded on a magnetic stripe on the back of the card may be insufficient to initiate an unauthorized transaction.

The card may include a communication circuit. The communication circuit may be capable of wired transmission. The communication circuit may be configured to implement protocols for wireless communication. For example, the communication circuit may provide functionality for conducting near field communication ("NFC"), Wi-Fi, Bluetooth, or any other suitable form of wireless communication. Wi-Fi may include passive Wi-Fi with lower power consumption than typical Wi-Fi.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
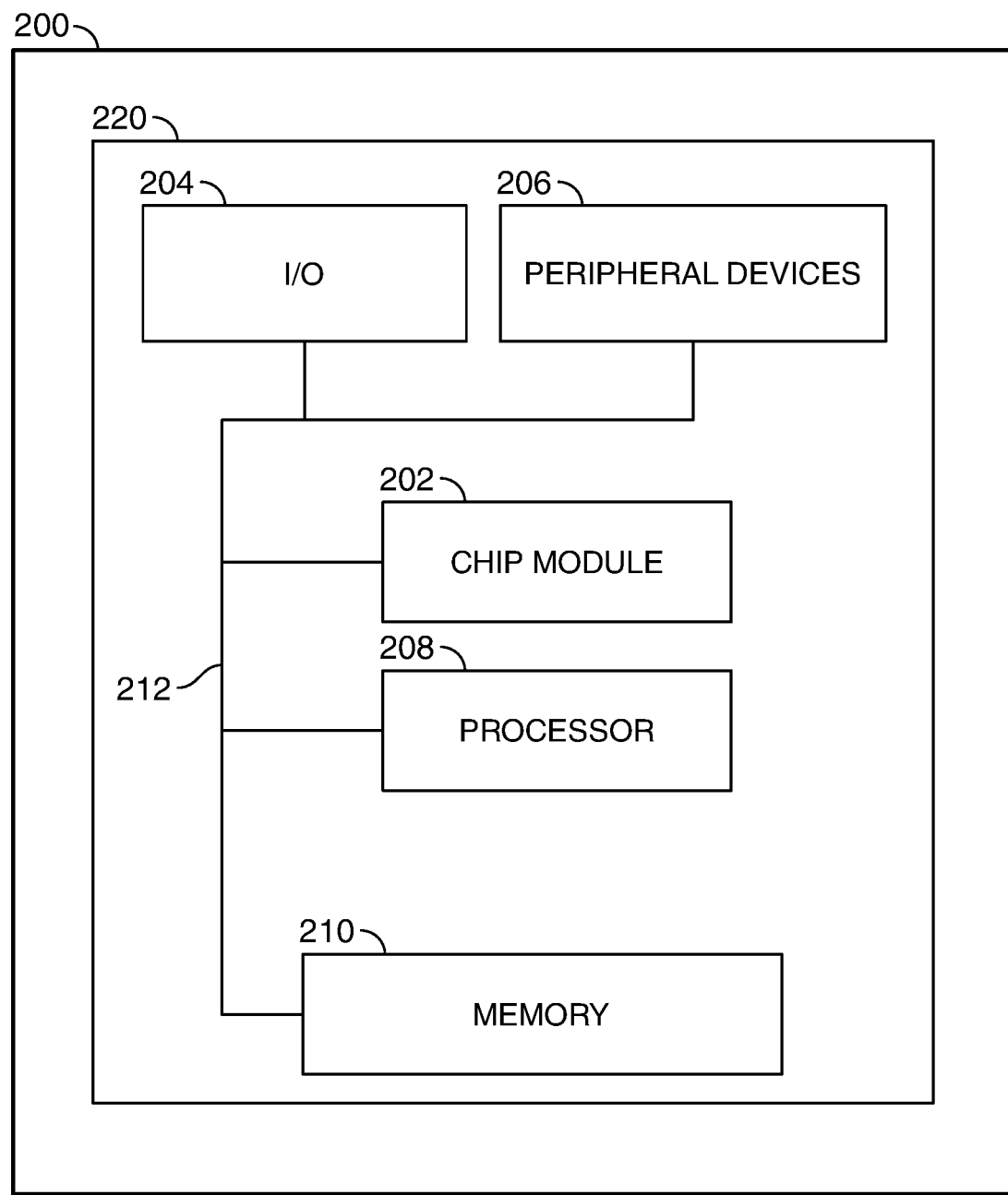
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
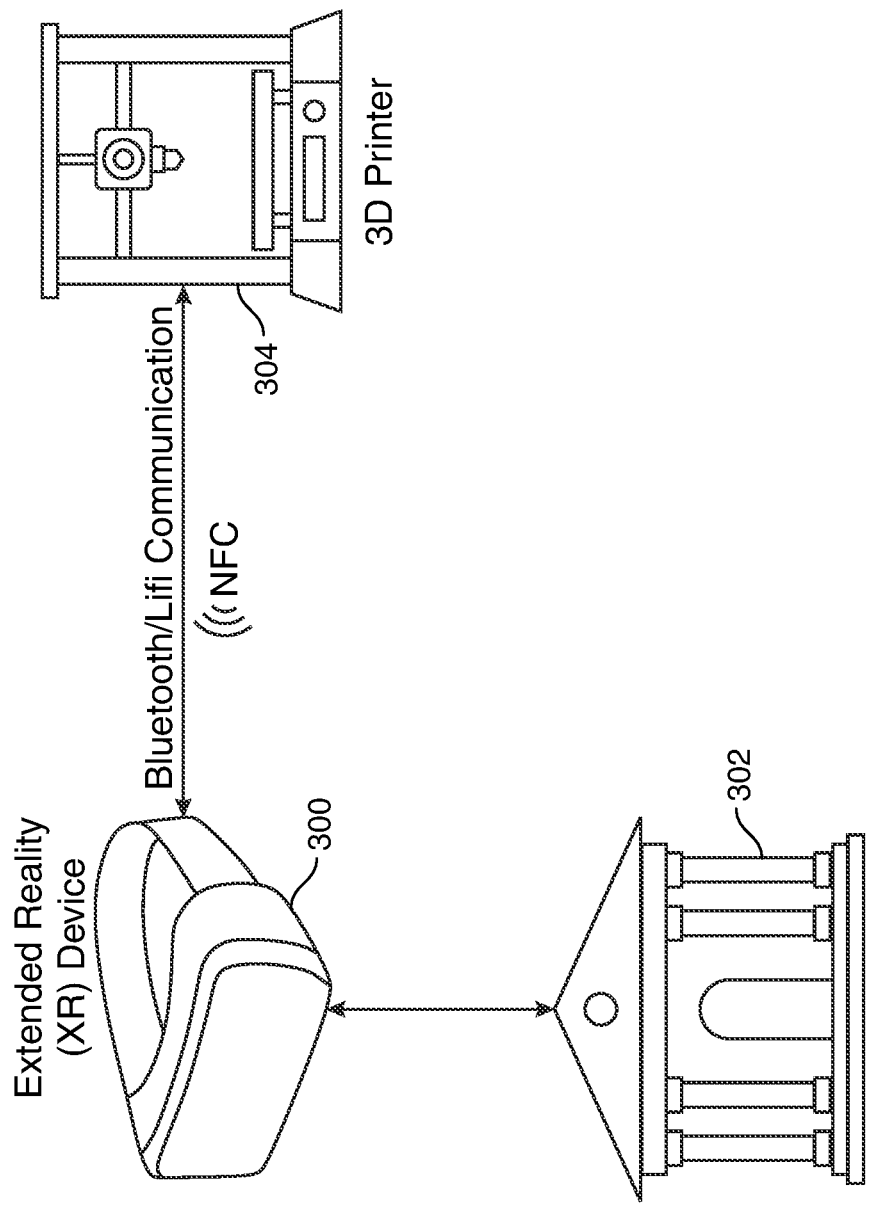
FIG. 3 shows an illustrative example of an XR device (an XR-compatible user device) that may interface with an issuer and a 3D printer in the XR environment in accordance with principles of the disclosure.

FIG. 3 shows an illustrative example of an XR device. XR device may be, for example, an XR headset 300, that may be worn by the user to interface with a card issuer 302, like a bank, for requisitioning and rendering of a payment instrument, such as a smart card. XR headset 300 may also communicate with or be paired to a 3D printer 304 that may be located near XR headset 300. XR headset 300 may display an XR interface on a user-facing surface where the interface may be used to access a website of the card issuer 302. Communication between XR device 300 and issuer 302 may take place, for example, over the Internet. In embodiments, 3D printer 304 may be in communication with XR headset 300 via a Bluetooth, Zigbee, a wireless optical networking technology, such as Li-Fi, or a near field communication (NFC) link. 3D printer 304 may have the capability of printing using multiple materials as feedstock for use in fabricating a payment instrument, including one or more layers of plastics or metal, a layer of MEMS smart dust, and smart chips.

A user may log into a card issuer's website to obtain a card. The login may use the same login procedure used to access user accounts at the bank or other institution or may use a different login procedure. Upon a successful user login, an XR session window may appear on XR headset 300. The window may include an interface that is used to enable user interactions with a card issuer in an XR environment.

Figure 4:
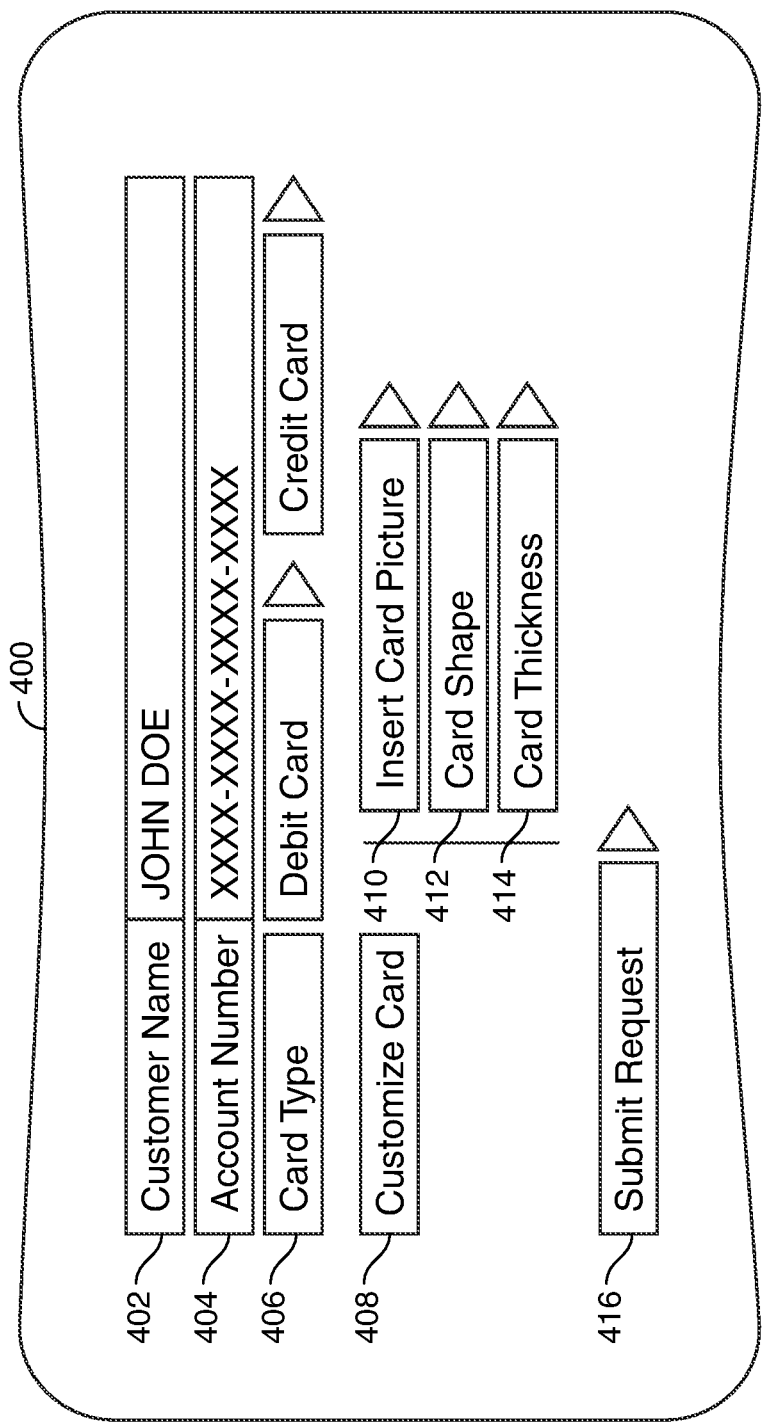
FIG. 4 shows an illustrative example of a card requisition interface in accordance with principles of the disclosure.

FIG. 4 shows an illustrative example of a card requisition interface 400 that may be viewed on XR headset 300 in an XR session window. User interactions may include selections of the various specifications for the card to be printed. The interactions may be made by the user in various ways. For example, a user may enter data in fields, may use available pull-down menus to make a selection, or may choose selections using available buttons. Some of the specifications that may be specified by the user may include customer name 402, account number 404, card type 506, like credit card, debit card, or prepaid card. The specifications that are allowed may optionally include desired card properties for customizing the card, such as an option for inserting a picture 410, a card shape option 412 to specify a card shape, and a card thickness option 414 to specify a thickness of the card, and any embossing details for the card. Some of the card properties, such as the dimensions, may be fixed to operate in a standardized payment instrument environment. Information that may be printed on the card may be based on a template specified by the card issuer. The user may submit the requested specifications at submit request box 416.

The user request may be received by the card issuer. The card issuer may generate instructions for rendering and printing a card on demand. The card may be a generated using a 3D card template based on the user specifications entered with the card requisition interface. A payload that includes the card, based on the card template, may be thereafter sent to the user for rendering and 3D printing. The card may be sent to the user as a payload in an NFT.

Figure 5A:
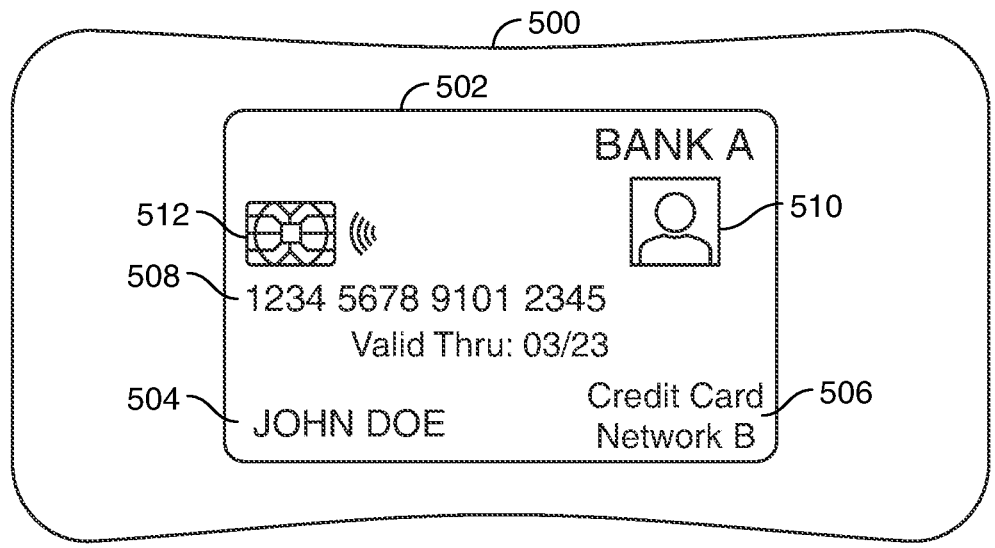
FIG. 5A shows an illustrative example of a card rendered in an XR environment in accordance with principles of the disclosure.

FIG. 5A shows an example of a screen 500 inside XR headset 300 onto which a front view of the 3D card 502 may be rendered for a preview by the user of the proposed printed card. If the user is not satisfied by the card as rendered, the user may be able to request revisions from the issuer. A rear view of the printed card may also be made available for viewing by the user on XR headset 300. Card 502 may include name 504, the name of a card issuer, such as Bank A, an indication of a card network 506 with which the card may be used, an account number and expiration date 508, and a smart chip 512.

Figure 5B:
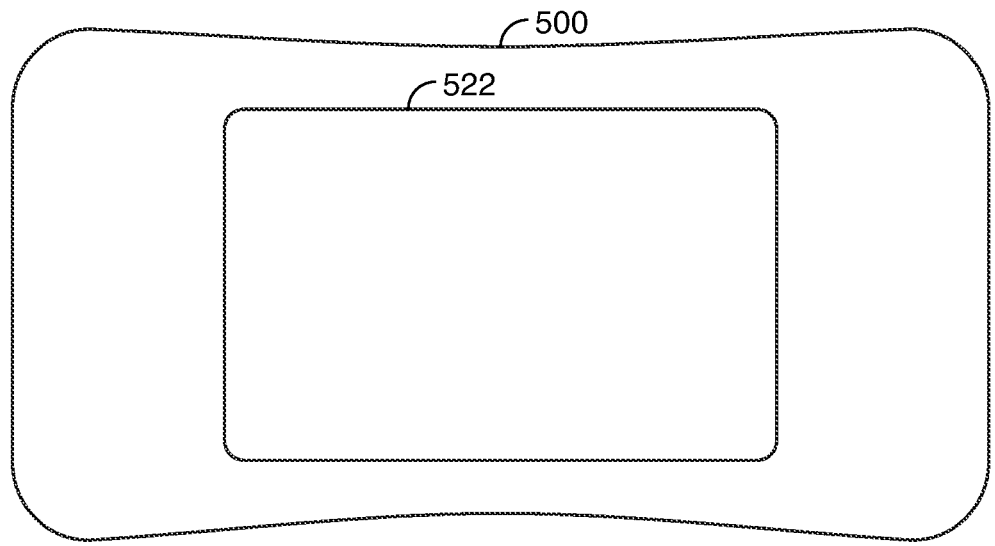
FIG. 5B shows another illustrative example of a card rendered in an XR environment in accordance with principles of the disclosure.

FIG. 5B shows another example of a card 522 that may be generated based on a user specification. Card 522 may be viewable on screen 500 and may be blank, at the user's request, without any information visible on its exterior.

Upon user approval, the user may print the card on demand on the 3D printer.

Figure 6A:
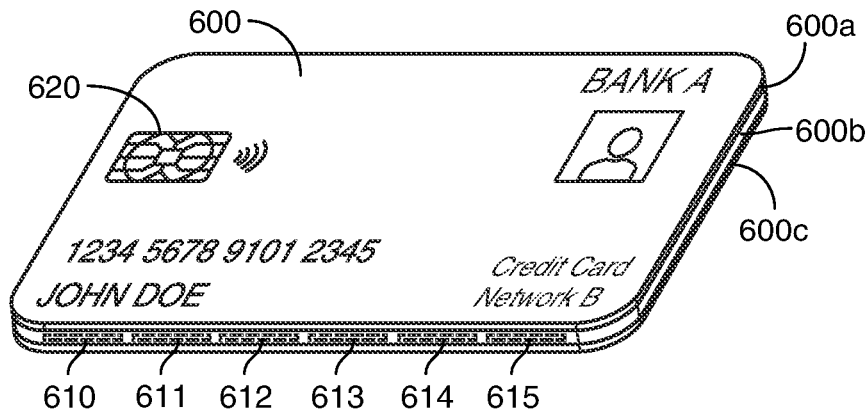
FIG. 6A shows a perspective view of a sample card that may be printed in accordance with principles of the disclosure.

FIG. 6A shows an illustrative example of a MEMS-enabled card 600 that may be printed by the user on a 3D printer, as seen in a perspective view. Card 600 may be printed with multiple layers, such as with respective front and back layers 600a and 600c, that may be made of the same or different materials, such as plastic or metal. Card 600 may include tactile sensors, such as formed with MEMS smart dust, that may be included in a layer of card 600, such as in an interior layer 600b that may be printed between front and back layers 600a and 600c. There may be additional layers of materials, such as additional plastic or metal layers, included in the interior of the 3D printed card. The order in which different layers of card 600 may be printed may vary.

The tactile sensors in card 600 may be laid out as a unique pattern specified by the card issuer based on a predefined grid pattern which may be used by the card issuer for its cards and may be standardized across cards of the card issuer or across cards from multiple issuers. The grid pattern may include, for example, 6 or 8 columns and 6 rows of potential locations at which the MEMS smart dust may be printed to create a unique pattern that uniquely identify the card. In the example of FIG. 6A, a grid pattern that includes six columns 610, 611, 612, 613, 614, and 615 of potential locations of MEMS smart dust are illustrated.

Card 600 may look like a conventionally issuer-printed card with the information specified by the user shown on the exterior of card 600. The MEMS pattern included in layer 600b may not be visible on the exterior of card 600.

A smart chip 620 may also be included on card 600. Smart chip 620 may be 3D printed or otherwise affixed onto the face of card 600. Smart chip 620 may not be programmed, or may only be partially programmed, when printed or affixed onto card 600 for security reasons and may be programmed at a later stage to activate card 600.

Figure 6B:
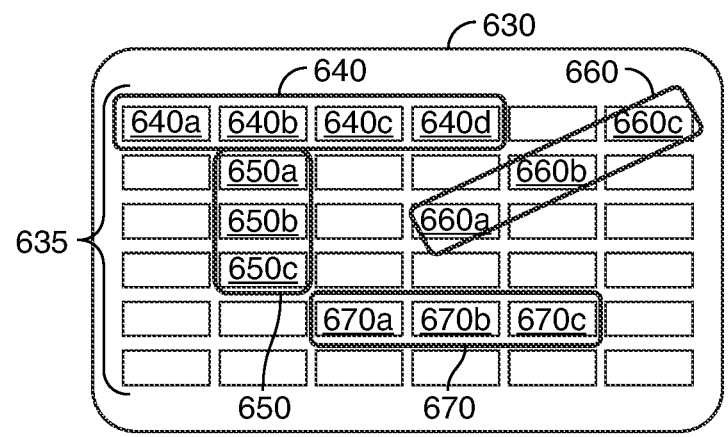
FIG. 6B shows an illustrative example of a layer of smart dust that may be included inside the printed card in accordance with principles of the disclosure.

FIG. 6B shows an illustrative example of layer 600b that may include a pattern of MEMS sensors. In the illustrated example, a template for printing the MEMS pattern may include a 6×6 grid layout 635 of potential locations for including the smart dust. This grid pattern of potential locations may extend across the full length and width of card 600 or may only include a more limited area of the card, such as an area only outside of the area covered by the smart chip. The actual positions in which the MEMS sensors are printed may be selected by the card issuer in one or more positions within the predefined grid pattern layout of the card issuer. The unique pattern of MEMS sensors within a given grid may be varied in various ways. For example, the locations used for MEMS sensors may vary, the number of MEMS sensors included in a pattern may vary, the placement of sensors may vary, there may be sub-patterns of sensors included in the pattern, a non-rectangular grid pattern of potential locations may be used, or the heights of the sensors may be varied. The pattern may also be varied in other ways.

The example in FIG. 6B shows a pattern of MEMS sensors that may include four sub-patterns 640, 650, 660, 670 of MEMS sensors formed on layer 600b. Sub-pattern 640 may be formed by including MEMS sensors in a horizontal orientation at four adjacent locations 640a, 640b, 640c, 640d in the grid. Sub-pattern 650 may be formed by including MEMS sensors in a vertical orientation at three locations 650a, 650b, 650c in the grid. Sub-pattern 660 may be formed by including MEMS sensors in a diagonal orientation at three locations 660a, 660b, 660c. Sub-pattern 670 may be formed by including MEMS sensors in a horizontal orientation at three locations 670a, 670b, 670c. The pattern, with or without sub-patterns, may uniquely identify the card. The other locations in the grid pattern may be left without any sensors being imprinted. It should be noted that while multiple sub-patterns are shown in FIG. 6B, each including several adjacent sensors, the unique pattern of MEMS sensors on a card need not include contiguous sensors in the grid pattern.

Figure 6C:
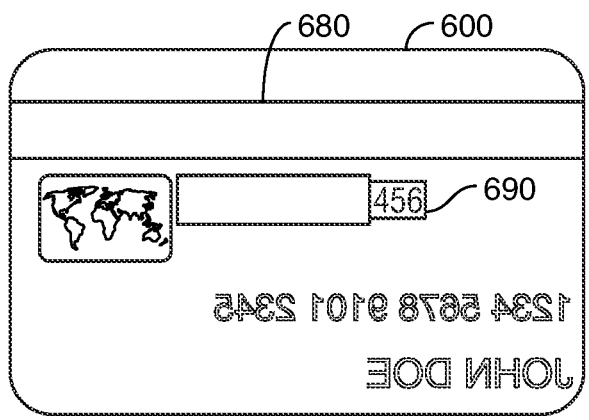
FIG. 6C shows a rear view of a sample card that may be printed in accordance with principles of the disclosure.

FIG. 6C shows an example of a rear view of card 600 that may be 3D printed. The back of card 600 may include a magnetic strip 680 for coding additional information on the card, a three digit security access code 690, and other information, such as an image.

Figure 7:
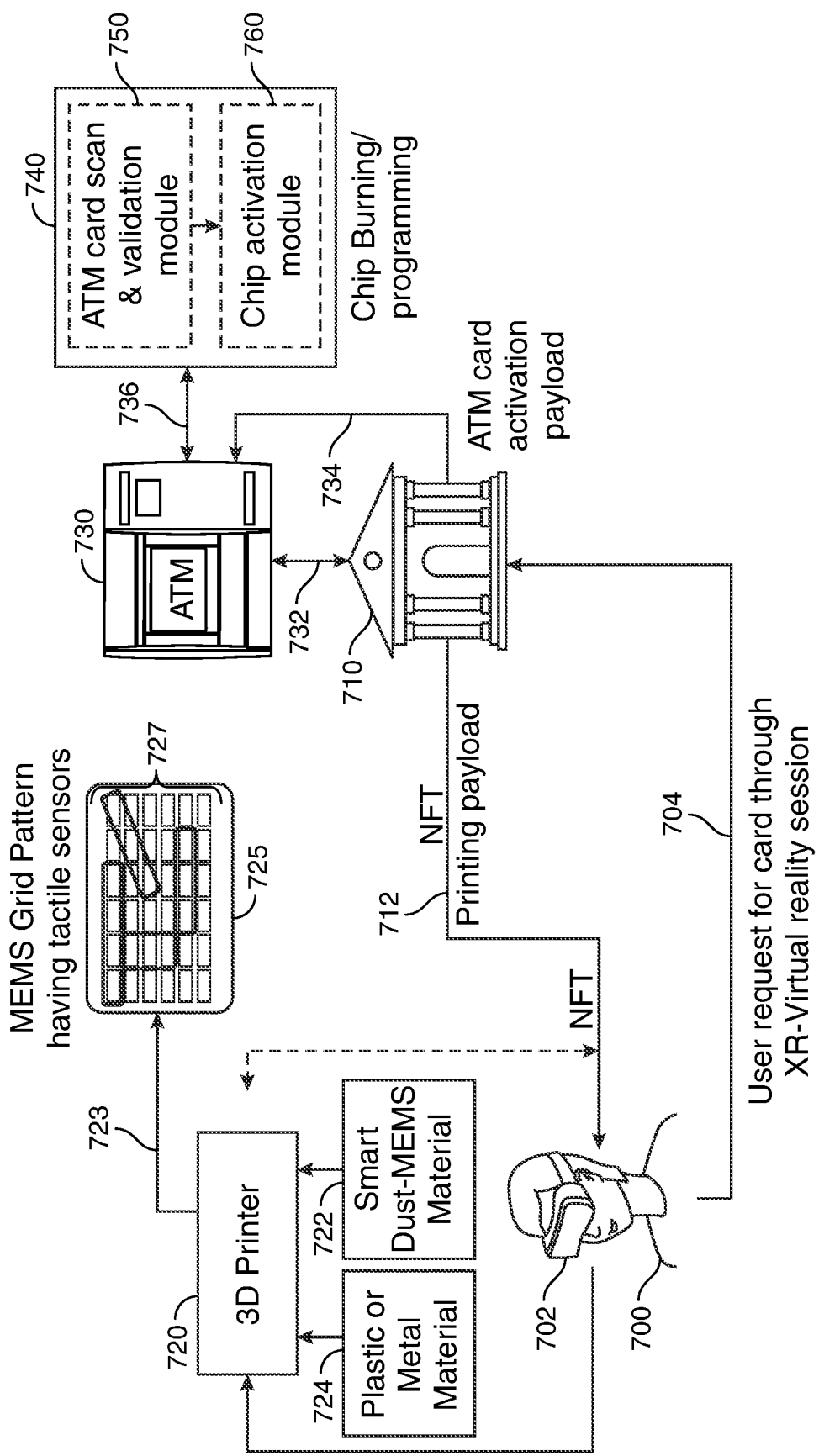
FIG. 7 shows an illustrative environment for rendering, printing, and activating a card in accordance with principles of the disclosure.

FIG. 7 shows an illustrative example of a metaverse environment in which a card may be rendered, 3D-printer, and activated. In this figure, user 700 is wearing XR headset 702. User 700 may login to a card issuer, such as the user's bank 710, and establish at 704 an XR or VR session on headset 702. The login may require multi-factor authentication. During the session, the user may specify user information and any user-selectable card specifications allowed by the card issuer. The card issuer 710 may process the user-provided information, verify the provided information, and render a template for a card based on the user-provided information. The card template may be sent to the user by the card issuer 710 at 712 as a payload for printing within a non-fungible token (NFT). The NFT may be secured to be private. Upon receipt by the user at XR headset 702, the NFT may be opened by user 700 and instructions sent to the user's 3D printer 720 for 3D printing the card.

Materials provided to the user's 3D printer 720 as feedstock may include materials 721 for printing various layers, such as one or more of plastic or metal materials, and MEMS smart dust material 722. The printed card 725 includes a MEMS layer 727. A smart chip may also be added to the card and a magnetic strip may also be added to card 725. The feedstock for 3D printer 720 may also include smart chips, which may be unprogrammed, and magnetic strips.

While the card may be printed on the user's 3D printer, the card may alternatively be printed at a 3D printer that may be provided at an ATM 730 that is associated with card issuer 710. The 3D printer at the ATM 730 may include similar feedstock materials as may be provided to a 3D printer 720 at a user's location. If the card is to be printed at an ATM 730, the user may travel to ATM 730 and use a user device, such as a mobile device or XR headset 702, to interact with the card issuer. ATM 730 may have an interface that is configured for the user device to forward a decrypted rendering of the card to ATM 730 for 3D printing of the card. The user may be able to forward the NFT that the user has received or may request that the issuer send a copy of the NFT to be sent to the ATM for 3D printing of the card. This may require that the user login at the ATM, such as with the user device, to decrypt the NFT. The card may be output for the user. The user may have to log in to ATM 730 using the user device as the user may not have a card to log in to ATM 730.

Once the card is 3D-printed either at the ATM 730 or elsewhere, ATM 730 may be used by user 700 to burn and program the smart chip 740. This process may include inserting the printed card into an ATM where the card may be scanned and validated, such as by using an ATM card scan and validation module 750 at ATM 730. The smart chip on the card may then be programmed and activated for use, such as by using a chip activation module 760 at ATM 730.

The card may be compressed with a card activation device at least on the areas of the grid pattern to activate the MEMS sensors on card 725 before the scanning and validation of the card. The card may be scanned to verify that the card to be activated corresponds to the card that the issuer has authorized for printing. ATM 730 may also verify certain user information including the user's ATM login and password. If the card is validated, the smart chip may then be activated by programming it to function as an active card. Upon activation, the card may then be used in accordance with its intended purposes, i.e., as a credit card, debit card, prepaid card, or otherwise.

FIG. 8 shows an illustrative example of one or more modules that may be provided by the card issuer to request, print, and activate the new card. These modules may be separately implemented, or various functions may be separated or combined into more or fewer modules.

A card requisition module 800 may be provided by the card issuer to interact with user and enable the requisition of a card. This process may include providing the user requisition interface to request a card. An XR-3D printer pairing module 810 may be provided to enable the pairing of an XR device with a 3D printer, which may be a printer accessible to the user or a printer at the ATM. A non-fungible token generator module 820 may be provided at the card issuer to generate NFTs to be sent to the user's XR device or to an ATM with a payload that includes instructions for rendering the card. A smart contract module 830 may be used to generate one or more smart contracts to be used for establishing rules for interactions between the user, the user's XR device, the card issuer, and the ATM. An NFT orchestration module 840 may orchestrate the NFT distribution to various users who request cards from the card issuer. A 3D card rendering module 850 may be provided by the card issue to render a 3D card on an XR device where the rendering may be viewed and then printed, if acceptable. A card printing module 870 may be provided to provide the functionality for 3D printing the card after the rendering is approved. A card activation module 860 may be used to activate the card after the card is validated based on the MEMS pattern and any user provided information. A card monitoring module 880 may monitor use of the card after it is printed.

Figure 9B:
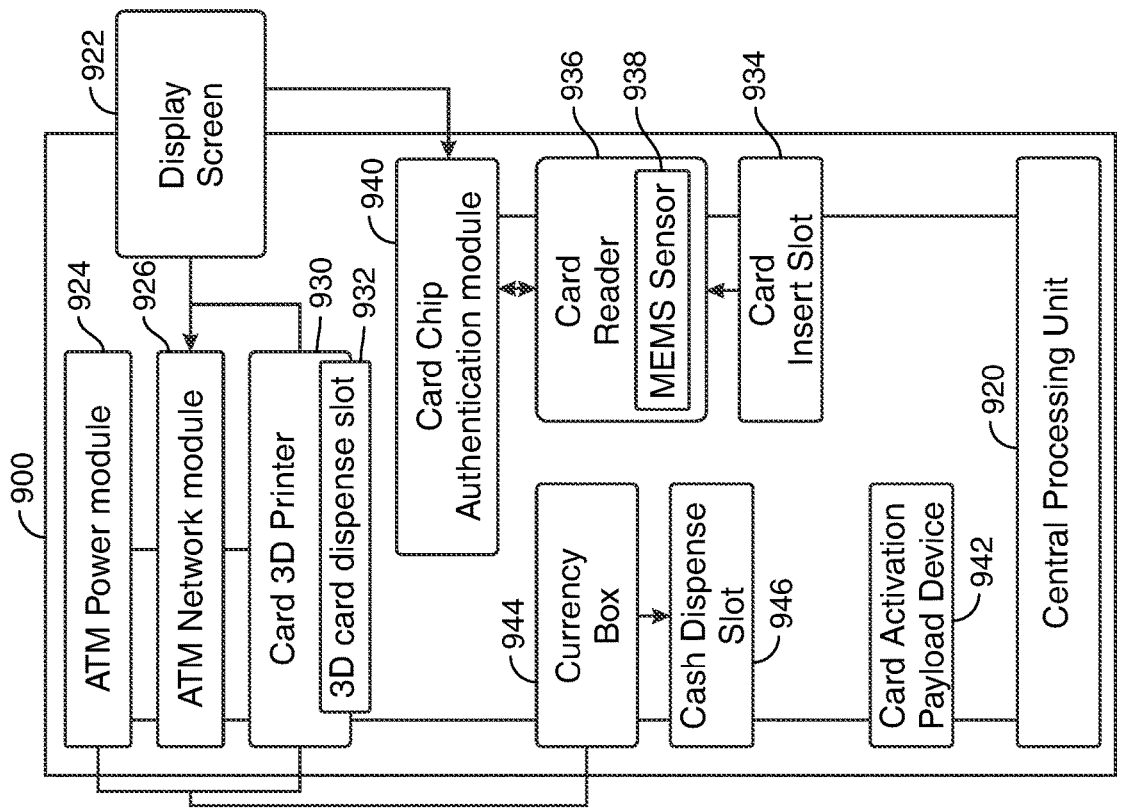
FIG. 9B shows an illustrative example of the apparatus of FIG. 9A that includes a 3D printer and a card activation payload device in accordance with principles of the disclosure.
Figure 9A:
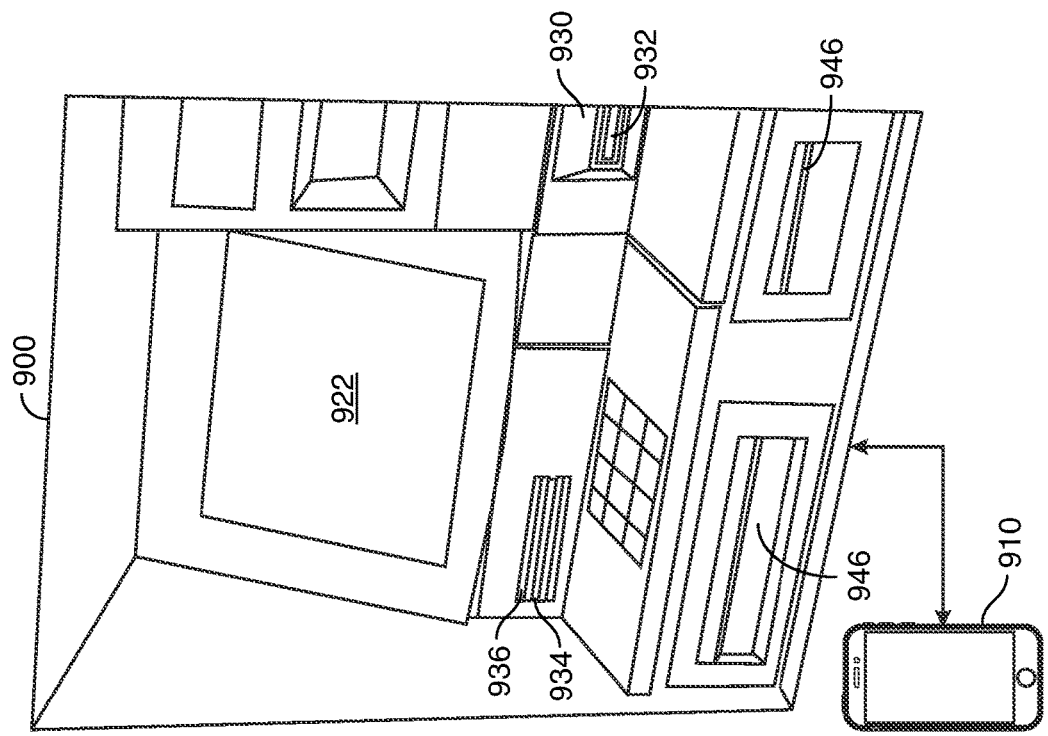
FIG. 9A shows an illustrative perspective view of an apparatus in accordance with principles of the disclosure.

FIGS. 9A and 9B show an illustrative example of an ATM 900 that may include a 3D printer for 3D-printing a card and a card reader for activating a 3D-printed card having a MEMS pattern. The 3D printer at ATM 900 may include a feeder for card printing materials, including MEMS smart dust to be used for forming a unique pattern in the card that is usable for card security. A mobile device 910, the user's XR device, or an device at the ATM, such as a keyboard or touchscreen, may be used to interact with ATM 900, such as to login to ATM 900 to 3D-print a card or to activate a 3D-printed card.

ATM 900 may include a central processing unit 920, a display screen 922, an ATM power module 924, an ATM network module 926 to network with an issuer's application servers, and a currency box 944 to dispense cash via a cash dispense slot 944. ATM 900 may have a wireless or XR interface for interfacing with mobile device 910 or a user's XR device. ATM 900 may also include a 3D printer 930 for a card, including a 3D card dispense slot 932 for dispensing the 3D-printed card. A card activation device (card activation payload device) 942 may exert pressure on the MEMS sensors to activate them tactilely to enable the sensing of the pattern. ATM 900 may include a card insert slot 934 for inserting a 3D printed card and an associated card reader 936 that may read a card inserted into card insert slot 934. Card reader 936 may read the MEMS sensor pattern from the card to detect whether the MEMS pattern corresponds to the designated MEMS pattern for the card. Card activation device 942 may be a separate component into which the card may have to be inserted and removed therefrom before the card is inserted into card reader 936 or card activation device may be included in card reader 936. The information obtained by card reader 936 may be authenticated by a card chip authentication module 940. Any additional information to be provided for authentication may be provided to ATM 900 on the user's mobile device 910 or XR device, or at the ATM, such as on a keypad or on a display screen 922, such as a display that has a touch screen.

Figure 10:
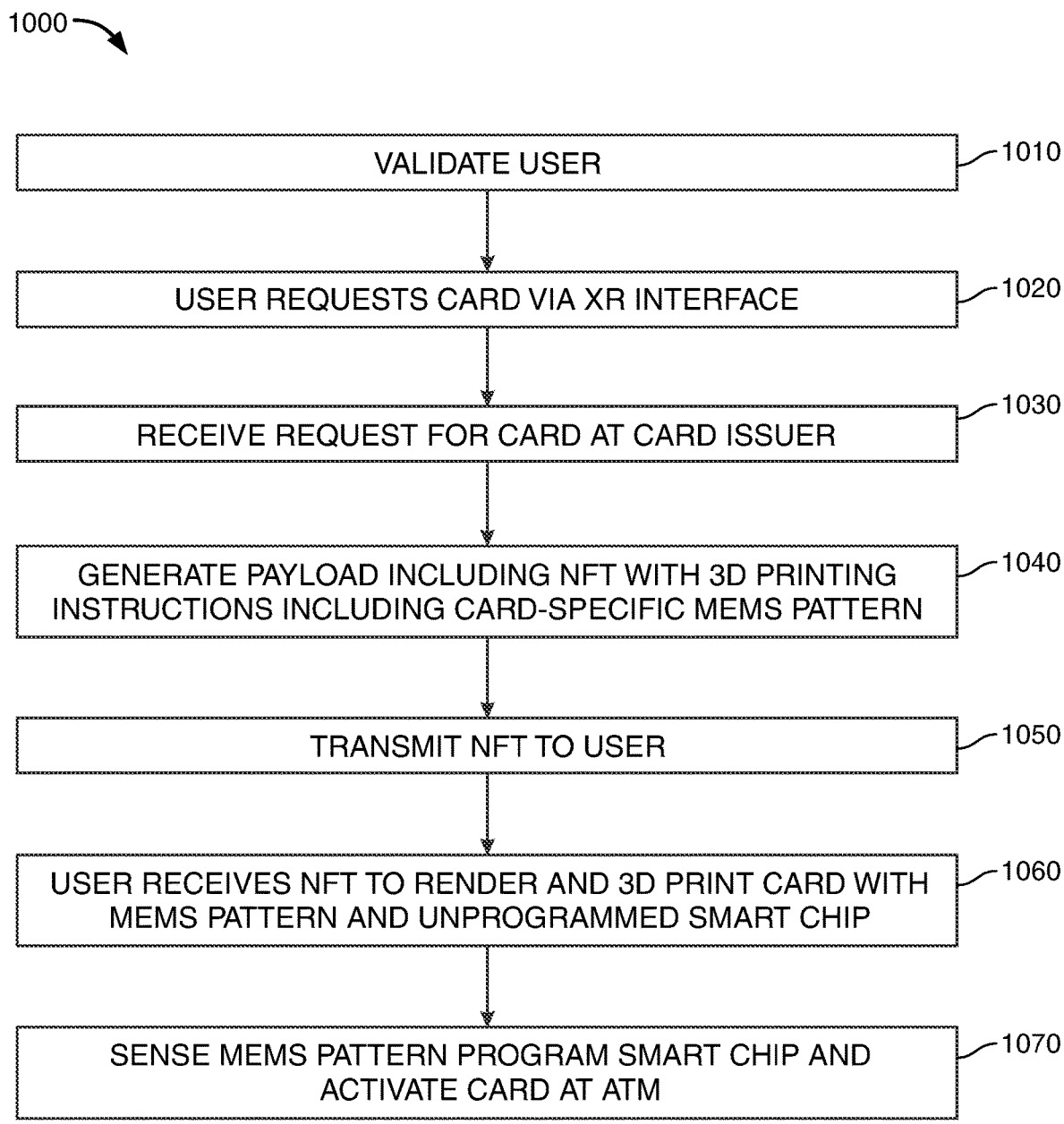
FIG. 10 shows an illustrative example of a flow chart for performing a method for 3D printing a card in accordance with principles of the invention.

FIG. 10 shows an illustrative example of a flow chart for performing a method for 3D printing a card.

At step 1010, a user may request a card from the card issuer. The requested card may be a replacement card. The user may first be required to log in such as, for example, via a card request interface on a card issuer website using an XR device or with another user device, such as a mobile device, which enables a user to access the card issuer request interface on the user's XR device. Step 1010 may require a multi-factor authentication by the user.

At step 1020, the user may request a card using an XR card request interface on the user device. The XR interface may be provided by the card issuer. The user may enter card specifications desired by the user via the provided XR interface. The card specifications may include information to be printed on the exterior of the card and additional specifications for the card based on specifications that are permitted by the interface. The specifications may be the same as or may vary from the specifications for a previous card that the current card is replacing. The user may transmit the card specifications to the card issuer as an encrypted payload.

At step 1030, the card issuer may receive the encrypted payload with the user-requested specifications for the card. The payload may be decrypted and the card specifications in the payload may be verified by the card issuer. This may include verification that the account number, type of card, and other card details are correct.

At step 1040, the card issuer may generate an NFT that includes 3D printing instructions for the card to be rendered by the user on the XR headset and 3D-printed by the user. The printing instructions may include a MEMS pattern to be printed in the card.

At step 1050, the NFT may be securely transmitted by the card issuer to the user. The NFT may be a private NFT that may be encrypted.

At step 1060, the NFT may be received at the user's XR headset. The user may use the received NFT to render the issuer-generated card design on the XR headset and to check whether the rendered card design is acceptable to the user. If it is acceptable, the NFT may be used by the user to 3D-print the card. The card may be 3D printed at an ATM that is equipped with a 3D printer or on a 3D printer to which the user has access, such as at the user's home, office, or elsewhere, other than at the ATM. The 3D printer may have 3D printing materials (feedstock) available to be input to the printer including, for example, materials suitable for forming the outer layers of the card, such as plastic or metal materials, as well as MEMS smart dust, smart chips and magnetic strips.

If the user chooses to 3D-print the card at an ATM, at step 1060, the user may visit an ATM with a 3D printer. The ATM to be visited may be an ATM that has been requested by the user (such as an ATM near the user's location) or at an ATM selected by the card issuer. The specific ATM to be used may be specified in the NFT. Once at the ATM, the user may login to the ATM, such as with a mobile device (as the card is not yet available for use), or with an XR interface, if the ATM is XR-enabled. Multi-factor authentication may be required. The card may then be printed at the ATM. The 3D-printed card may include the MEMS pattern specified in the NFT, an unprogrammed smart chip, and other elements, such as a magnetic strip on the back of the card to store additional information.

If the 3D printer is a 3D printer to which the user has access and is not a 3D printer at the ATM, at step 1060, the XR device may be paired to a desired 3D printer if the XR device has not been previously paired to the 3D printer. The user may 3D-print the card on the paired 3D printer.

Thereafter, if a user has 3D-printed the card not at an ATM, the user may visit an ATM, which may be selected by the user or selected by the card issuer, and may login at the ATM.

At step 1070, the 3D-printed card may be inserted by the user into a card reader at the ATM. The card reader may include a card activation payload device that may be used to validate and activate the card. The card reader may compress the MEMS pattern printed in the card at locations within a predefined grid pattern in which MEMS sensors may be located. In this manner, the card reader may tactilely sense (detect) and decipher the printed MEMS pattern to read and verify the detected printed MEMS pattern for security purposes.

Additional information may be used as validation parameters at the ATM besides the MEMS pattern that is based on a predefined MEMS smart dust tactile grid pattern. This additional information may be encoded on the 3D-printed card or may be associated with the user logged into the ATM. These include a printer IP address for a user 3D printer that printed the card, or an ATM ID for a 3D printer at an ATM that printed the card, an ATM ID for an ATM that may be specified by the card issuer for 3D printing or activating the card, a specified 3D printer device property, a print proximity parameter paired device, a geo location of the XR device, 3D printer or ATM, card details, including card number, CVV code, date of birth of the user and a card expiration data.

Upon validation of the card, the unprogrammed smart chip may be programmed by the ATM to activate the card. Once the card is activated, transactions may be performed using the card.

The MEMS pattern on the card may also be used after the card is activated for authenticating the card for performing transactions.

Interactions between the XR devices and the card issuer may be governed by smart contracts.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may implement a card requisition via an XR interface where the card may be 3D printed on-demand and include a pattern of MEMS to be used for security purposes in activated the 3D-printed card. Persons skilled in the art will appreciate that the present invention can be practiced by other than the described embodiments, which are presented for purposes of illustration rather than of limitation.

What is claimed is:

1. A computer program product comprising executable instructions that, when executed by a processor on a computer system, enable a user to print a payment instrument on-demand by:
   providing, to a user at an XR device, an extended reality (XR) user interface on the XR device, wherein the user interface is configured for the user to enter one or more specifications for the payment instrument to be printed on a 3D printer by the user;
   receiving, by an issuer of payment instruments from the user, a request to authorize the printing of the payment instrument based on the one or more specifications entered by the user at the XR device;
   validating, by the issuer, the request;
   generating, by the issuer upon successful validation of the request, a non-fungible token (NFT) comprising a payload having instructions for the user to render the payment instrument on the XR device and to print the payment instrument on the 3D printer;
   transmitting, by the issuer, the NFT to the user for 3D printing the payment instrument; and
   specifying, by the issuer, in the payload of the NFT instructions for printing in the payment instrument a pattern of micro electromechanical system (MEMS) sensors that are unique to the payment instrument to be printed;
   wherein the specified pattern of MEMS sensors is selected by the issuer for placement in selected locations of the payment instrument based on a predefined grid pattern of potential MEMS sensor locations.

2. The computer program product of claim 1, wherein the payment instrument is to be printed as multiple layers, and the pattern of MEMS sensors is configured to be printed by the 3D printer in one of the multiple layers in the smart card.

3. The computer program product of claim 1, wherein the executable instructions further enable:
   authenticating, at an automated teller machine (ATM), the payment instrument after the payment instrument has been 3D-printed by sensing the pattern of MEMS sensors in the card that are unique to the printed payment instrument;
   programming, at the ATM, the smart chip upon authentication of the payment instrument; and
   activating, at the ATM, the payment instrument.

4. The computer program product of claim 2, wherein the executable instructions further enable the user to render an image of the payment instrument on the XR device based on the NFT before the payment instrument is printed on the 3D printer.

5. The computer program product of claim 2, wherein the executable instructions further enable the user to print the payment instrument on the 3D printer on demand after the user receives the NFT at the XR device.

6. The computer program product of claim 2, wherein the executable instructions further enable the user to print the payment instrument, including an unprogrammed smart chip in the payment instrument.

7. The computer program product of claim 1, wherein the XR user interface is configured to present to the user an interface comprising one or more fields in which the user is to enter the one or more specifications.

8. The computer program product of claim 2, wherein the one or more specifications includes one or more of customer name, account number, card type, card picture, card shape, or card thickness.

9. The computer program product of claim 1, wherein the 3D printer is paired to the XR device.

10. The computer program product of claim 1, wherein the payment instrument has a size that is no larger than 85.6 mm by 53.98 mm×0.8 mm.

11. The computer program product of claim 2, wherein the 3D printer is located at an automated teller machine (ATM).

12. The computer program product of claim 11, wherein the executable instructions further enable the user to cause the NFT to be transmitted to the ATM for the user to print the payment instrument on demand at the ATM.

13. A computer program product comprising executable instructions that, when executed by a processor on a computer system, enable a user to print a payment instrument on-demand by:
   providing, to a user at an XR device, an extended reality (XR) user interface on the XR device, wherein the user interface is configured for the user to enter one or more specifications for the payment instrument to be printed on a 3D printer by the user;
   receiving, by an issuer of payment instruments from the user, a request to authorize the printing of the payment instrument based on the one or more specifications entered by the user at the XR device;
   validating, by the issuer, the request;
   generating, by the issuer upon successful validation of the request, a non-fungible token (NFT) comprising a payload having instructions for the user to render the payment instrument on the XR device and to print the payment instrument on the 3D printer;
   transmitting, by the issuer, the NFT to the user for 3D printing the payment instrument; and
   specifying, by the issuer, in the payload of the NFT instructions for printing in the payment instrument a pattern of micro electromechanical system (MEMS) sensors that are unique to the payment instrument to be printed;
   wherein the specified pattern of MEMS sensors is selected by the issuer for placement in selected locations of the payment instrument based on a predefined grid pattern of potential MEMS sensor locations.

14. The method of claim 13, further comprising:
   authenticating, at an automated teller machine (ATM), the payment instrument after the payment instrument has been 3D-printed by sensing the pattern of MEMS sensors in the card that are unique to the printed payment instrument;
   programming, at the ATM, the smart chip upon authentication of the payment instrument; and
   activating, at the ATM, the payment instrument.

15. An automated teller machine (ATM) for performing banking transactions and manufacturing a payment instrument on a 3D printer, the ATM comprising:
   a 3D printer to 3D print the payment instrument, including one or more feeds to feed to the 3D printer materials for printing the payment instrument based on the one or more specifications of a user and printing on the payment instrument a smart chip and a pattern of MEMS specified by an issuer of the payment instrument; and
   a processor that is configured to:
      receive a non-fungible token (NFT) comprising a payload having instructions for printing the payment instrument; and
      print the payment instrument on the 3D printer at the ATM based on the received NFT;
   wherein the instructions for printing the payment instrument includes instructions for printing a unique pattern of micro electromechanical sensors (MEMS) sensors in the payment instrument; and
   wherein the unique pattern of micro electromechanical system (MEMS) sensors to be printed are specified by the issuer of the payment instrument and are unique to the payment instrument to be printed.

16. The ATM of claim 15, wherein the pattern of MEMS sensors is specified to be placed in locations of the payment instrument based on a predefined grid pattern of potential MEMS sensor locations.

17. The ATM of claim 16, further comprising a communications interface to pair the ATM to an extended reality (XR) device of the user:
   wherein the XR device is configured to:
      provide an XR user interface on the XR device and to enable the user to enter one or more specifications for the payment instrument to be 3D printed by the user and to obtain NFT from the issuer of the payment instrument;
      generate, by the issuer upon successful validation of the request, a non-fungible token (NFT) that comprises a payload having instructions for printing the payment instrument on the 3D printer of the ATM; and
      transmit, by the issuer in response to the request, the NFT to the extended reality (XR) user interface to be used by the user to authorize the printing of the payment instrument on the 3D printer of the ATM.

18. An automated teller machine (ATM) for performing banking transactions and activating a payment instrument that has been printed on-demand by a user on a 3D printer, the ATM comprising:
   a card activation device that is configured to authenticate the payment instrument by tactilely activating a pattern of micro electromechanical sensors (MEMS) sensors in the payment instrument by exerting pressure on the payment instrument and the MEMS sensors therein and reading the pattern of MEMS sensors; and
   a processor that is configured to authenticate the payment instrument, program the smart chip and activate the payment instrument upon authentication of the payment instrument.

19. The ATM of claim 18, wherein the ATM further comprises:
   a 3D printer to 3D print the payment instrument, including one or more feeds to feed to the 3D printer materials for printing the payment instrument based on the one or more specifications of a user and printing on the payment instrument a smart chip and the pattern of MEMS sensors specified by an issuer of the payment instrument.

20. The ATM of claim 18, wherein the payment instrument to be authenticated has been generated by:
   providing, to a user at an XR device, an extended reality (XR) user interface on the XR device, wherein the user interface is configured for the user to enter one or more specifications for the payment instrument to be printed on a 3D printer by the user;

receiving, by an issuer of payment instruments from the user, a request to authorize the printing of the payment instrument based on the one or more specifications entered by the user at the XR device;

validating, by the issuer, the request;

generating, by the issuer upon successful validation of the request, a non-fungible token (NFT) comprising a payload having instructions for the user to render the payment instrument on the XR device and to print the payment instrument on the 3D printer;

transmitting, by the issuer, the NFT to the user for printing the payment instrument on the 3D printer; and specifying, by the issuer, a pattern of micro electromechanical system (MEMS) sensors that are unique to the payment instrument to be printed;

wherein the instructions in the payload of the NFT for printing the payment instrument include instructions for printing the unique pattern of micro electromechanical sensors (MEMS) sensors in the payment instrument.

\* \* \* \* \*